3,488,393
PREPARATION OF BIS(HALO-METHOXY) METHANES
Paul R. Stapp, Bartlesville, Okla., assignor to Phillips Petroleum Company, a corporation of Delaware
No Drawing. Filed May 22, 1967, Ser. No. 640,381
Int. Cl. C07c 43/30, 43/12
U.S. Cl. 260—614                                     10 Claims

ABSTRACT OF THE DISCLOSURE

A process for the production of bis(halomethoxy) methanes by reacting paraformaldehyde with anhydrous hydrogen halide at temperatures within the range of from −100° C. to 100° C. in the presence of certain olefinic compounds.

---

This invention relates to a process for preparing bis (halomethoxy)methanes.

One object of this invention is to provide a novel process for preparing bis(halomethoxy)methanes which are useful as bactericides.

Another object of this invention is to provide the novel process of reacting paraformaldehyde with anhydrous hydrogen halide in the presence of a catalytic amount of certain olefinic materials.

The reaction between anhydrous hydrogen halides and paraformaldehyde typically produces a mixture of bis (halomethoxy)methane and bis(halomethyl)ether, the product ratio of the former to the latter being conventionally about 0.045 to 1. I have discovered that if the above reaction is carried out in the presence of certain olefinic materials, the product ratio of the bis(halomethoxy)methane to the bis(halomethyl)ether is increased to about 3:1.

A number of olefinic materials can be used in this process. Examples of suitable olefinic materials that can be used in this process include ethylene, allyl halides, and alkyl-substituted derivatives of the latter such as, for example: methallyl chloride, 2-butenyl chloride, crotyl chloride and the like, and mixtures thereof. It is generally preferred that essentially catalytic amounts such as from about 0.001 to 0.2 moles of olefinic material be present for each mole of paraformaldehyde (calculated as $CH_2O$) in the reaction zone. However, greater amounts can be used if desired.

The hydrogen halides, HCl, HBr, HI and HF can all be used; however, the use of HCl is presently preferred.

The theoretical molar ratio of the paraformaldehyde (calculated as $CH_2O$ for this purpose) to the hydrogen halide in the reaction zone is 1.5:1; however, ratios above and below this figure can be used if desired. Generally, the molar ratio of paraformaldehyde to the hydrogen halide can be in the range of from 1:1 to about 10:1. It is generally preferred to have an amount of hydrogen halide present in the reaction zone which is in excess of the theoretical.

Preferably, the contact of these reagents and the olefinic material is carried out at a temperature within the range of −100° C. to 100° C. and more preferably at a temperature in the range of from −65° C. to 0° C. At present, the process is preferably carried out in a manner such that liquid water formed in the reaction is frozen as it is formed and therefore does not admix with the reactants. The process can be carried out under any convenient pressure either above or below atmospheric, but it is preferred to use a pressure that is sufficient to maintain the reaction mixture substantially in the liquid phase. The reaction is rapid, and the reaction time will be in the range of from about 1 minute to several hours depending upon the contacting techniques used and the desired degree of conversion.

The process can be carried out either batchwise or continuously. In the batch process, the hydrogen halide can be passed into a system containing paraformaldehyde and the olefinic compound. When using ethylene as the olefinic compound, the hydrogen halide and the ethylene can be separately passed into the paraformaldehyde in the batch reactor. In continuous operation, the three essential ingredients can be brought together simultaneously for a sufficient time to result in the desired degree of conversion before the subsequent isolation and recovery steps.

The reaction can be carried out either in the presence or absence of an inert diluent or solvent. Suitable diluents or solvents include ethers, saturated halogenated hydrocarbons, saturated aliphatic hydrocarbons, aromatic hydrocarbons, and the like. Specific examples of the same include diethyl ether, methyl ethyl ether, hexane, benzene, toluene, methylene chloride, and mixtures thereof.

The product can be removed and isolated by any method known in the art. It is generally desirable to remove the excess hydrogen halide from the reaction mixture by water washing or by washing the reaction mixture with an aqueous solution of a base such as sodium bicarbonate, or by purging the reaction zone with an inert gas. The products can then be isolated conveniently by fractionation.

The bis(halomethoxy)methanes formed by the above described reaction are generally useful as bactericides, fungicides, pesticides, herbicides, and plasticizers for vinyl resins such as polyvinyl chloride.

This invention can be further illustrated by the following examples:

EXAMPLE 1

Reaction in the presence of allyl chloride

A reactor equipped with a stirrer, low temperature thermometer, and a gas dispersion tube, was charged with 401 parts by weight methylene chloride, 200 parts by weight paraformaldehyde, and 33.2 parts by weight of allyl chloride. The mixture was cooled to about −65° C. and hydrogen chloride was passed to the cooled reaction mixture for about five hours. The reaction mixture was next allowed to warm at room temperature and was then dried by passage through calcium chloride. The resulting dried mixture was distilled to remove the methylene chloride and then fractionated yielding a 21.5 parts by weight fraction consisting essentially of bis(chloromethyl)ether and a 73.3 parts by weight fraction which was primarily bis(chloromethoxy)methane.

EXAMPLE 2

Reaction in the absence of olefinic material

As a control test to demonstrate the results of this reaction without the benefits of the present invention, the above test was repeated except that no allyl chloride was present. Fractionation of the products obtained yielded a 181.3 parts by weight fraction which contained chiefly the bis(chloromethyl)ether and a 8.2 parts by weight fraction which consisted of about equal parts by weight of the bis(chloromethyl)ether and the bis(chloromethoxy) methane. These results illustrate the conventionally poor yields of the bis(chloromethoxy)methane, when using the prior art process.

EXAMPLE 3

Reaction in the presence of allyl chloride

The conversion of Example 1 was essentially repeated except that less allyl chloride was present in the system.

The charge in the reaction vessel consisted of 200 parts by weight of paraformaldehyde, 401 parts by weight methylene chloride, and only 11.1 parts by weight allyl chloride. Hydrogen chloride was again passed into the cooled reaction mixture for about five hours although adsorption of the hydrogen chloride appeared to cease after about 2.5 hours. Using the same recovery procedure as Example 1, 35.8 parts by weight of bis(chloromethyl) ether and 162.8 parts by weight of bis(chloromethoxy) methane were obtained. Therefore, as illustrated, even small amounts of allyl chloride are effective.

EXAMPLE 4

Reaction in the presence of ethylene

A reactor equipped with a stirrer, a low temperature thermometer, a condenser, and two gas dispersion tubes was charged with 120 parts by weight of paraformaldehyde and 534 parts by weight of methylene chloride. The mixture was cooled to about −65° F. and saturated with HCl through one dispersion tube over a 25 minute period. While keeping a slow stream of hydrogen chloride through the one dispersion tube, ethylene was passed to the reaction mixture through the other dispersion tube as fast as it was absorbed. After 1.5 hours, ethylene and hydrogen chloride adsorption ceased and paraformaldehyde had gone into solution. The mixture was allowed to warm to room temperature. Using essentially the same recovery procedure as that of Example 1, 10.5 parts by weight of bis(chloromethyl)ether and 52.6 parts by weight of bis(chloromethoxy)methane were obtained.

EXAMPLE 5

A series of tests were made using bis(chloromethoxy) methane as a bactericide. The test results show one-hundred percent control of the bacteria *Erwinia amylovera, Xanthomonas phaseoli, Staphylococcus aureus,* and *Escherichia coli* by bis(chloromethoxy)methane in concentrations which ranged from 32–250 parts per million.

The above examples illustrate the improved process of this invention and a specific utility for the products obtained therefrom.

As will be readily apparent to those skilled in the art, various changes and modifications may be made in this process without departing from the spirit and scope of this invention.

I claim:

1. The process comprises reacting paraformaldehyde with an anhydrous hydrogen halide at a temperature within the range of −100° C. to 100° C. and in the presence of an olefinic material selected from the group consisting of ethylene, allyl halides, alkyl-substituted derivatives of allyl halides, and mixtures thereof, wherein said alkyl radical contains up to 4 carbon atoms.

2. The process of claim 1 wherein from 0.001 to 0.2 moles of said olefinic material are present for each mole of paraformaldehyde (calculated as $CH_2O$) said olefinic material being selected from the group consisting of ethylene and allyl chloride.

3. The process of claim 2 wherein the molar ratio of paraformaldehyde (calculated as $CH_2O$) to hydrogen halide is from 1:1 to about 10:1.

4. The process of claim 3 wherein about 1 mole of anhydrous hydrogen halide is reacted with each 1.5 moles of paraformaldehyde (calculated as $CH_2O$).

5. The process of claim 4 carried out at a temperature in the range of from −65° C. to 0° C.

6. The process of claim 5 wherein said anhydrous hydrogen halide is anhydrous hydrogen chloride said process being conducted in the presence of a solvent.

7. The process of claim 6 wherein said olefinic material is ethylene.

8. The process of claim 6 wherein said olefinic material is allyl chloride.

9. A process according to claim 7, wherein said solvent is methylene chloride.

10. The process according to claim 8 wherein said solvent is methylene chloride.

References Cited

UNITED STATES PATENTS 2,532,044 11/1950 Walker et al.
2,704,299 3/1955 Buc _____ 260—614

FOREIGN PATENTS 615,634 1/1949 Great Britain.

OTHER REFERENCES

Yur'ev et al., Zhur, Obsch. Khim., 32 (1962) pp. 259–263.

LEON ZITVER, Primary Examiner

H. T. MARS, Assistant Examiner

U.S. Cl. X.R.

260—615